United States Patent
Ooi et al.

(10) Patent No.: US 7,565,457 B2
(45) Date of Patent: Jul. 21, 2009

(54) SERIAL ADVANCED TECHNOLOGY ATTACHMENT DEVICE PRESENCE DETECTION AND HOT-PLUG IN LOW POWER MODE

(75) Inventors: Eng Hun Ooi, Penang (MY); Fei Deng, Folsom, CA (US); Jien Hau Ng, Perak (MY); Serge Bedwani, Folsom, CA (US); Siang Lin Tan, Penang (MY)

(73) Assignee: Intel Corporation, Santa Clara, CA (US)

( * ) Notice: Subject to any disclaimer, the term of this patent is extended or adjusted under 35 U.S.C. 154(b) by 361 days.

(21) Appl. No.: 11/479,413

(22) Filed: Jun. 30, 2006

(65) Prior Publication Data

US 2008/0001480 A1 Jan. 3, 2008

(51) Int. Cl.
*G06F 3/00* (2006.01)
*G06F 13/00* (2006.01)

(52) U.S. Cl. ............................ 710/15; 710/72; 710/109; 710/305

(58) Field of Classification Search ............. 710/15–19, 710/72–74, 109, 305–316; 365/226, 230.06
See application file for complete search history.

(56) References Cited

U.S. PATENT DOCUMENTS

| 6,411,562 | B1 * | 6/2002 | Huber | 365/230.06 |
| 6,722,261 | B1 * | 4/2004 | Brown et al. | 92/5 R |
| 7,009,827 | B1 * | 3/2006 | Lee et al. | 361/91.1 |
| 2002/0064076 | A1 * | 5/2002 | Huber | 365/226 |

* cited by examiner

*Primary Examiner*—Christopher B Shin
(74) *Attorney, Agent, or Firm*—Derek J. Reynolds (57) ABSTRACT

A method, circuit, and system are disclosed. In one embodiment, the method comprises sending a step pulse across a serial advanced technology attachment (SATA) transmission line, determining the length of time the transmission line takes to charge from common mode voltage to supply voltage, and determining whether a device is connected to the SATA transmission line based on the length of the transmission line charge time.

24 Claims, 6 Drawing Sheets

SERIAL ADVANCED TECHNOLOGY ATTACHMENT DEVICE PRESENCE DETECTION AND HOT-PLUG IN LOW POWER MODE

FIELD OF THE INVENTION

The invention relates to Serial Advanced Technology Attachment (SATA) power management and hot-plug capabilities.

BACKGROUND OF THE INVENTION

Serial Advanced Technology Attachment (SATA) devices are becoming prevalent on many mobile and desktop computers. SATA is a high-speed data interconnect used for communication between input/output (I/O) devices and the host controller(s) that are connected to or embedded within a chipset. There are many benefits to SATA including having a dedicated interconnect per device to increase data throughput, native command queuing (NCQ) that increases performance of SATA hard disks by allowing the individual hard disk to receive more than one I/O request at a time and decide which to complete first, and hot-plugging, which allows removing and replacing components within a computer system, while the system is operating.

The hot-plugging benefit, also called hot-swapping, is very useful for many mobile computer users because the mobile computer's limited size rarely allows it enough drive bays to concurrently run an extra hard disk drive, a CD-ROM drive, a DVD drive, or any other number of hardware peripherals. Thus, hot-plugging between two or more of these devices is very beneficial to a mobile computer user to allow work to continue without requiring a reboot.

Additionally, as computers become more powerful and more portable, the need for power savings increases to allow longer battery life, decrease total system weight, and decrease the necessary expensive thermal solution requirements among other benefits. Although SATA devices do allow hot-swapping, the current SATA Advanced Host Controller Interface (AHCI) definition requires that hot-swap capabilities and SATA power management be mutually exclusive.

DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a method, apparatus, and system to enable native SATA device presence detection and hot-plugging in SATA AHCI low power mode are disclosed. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
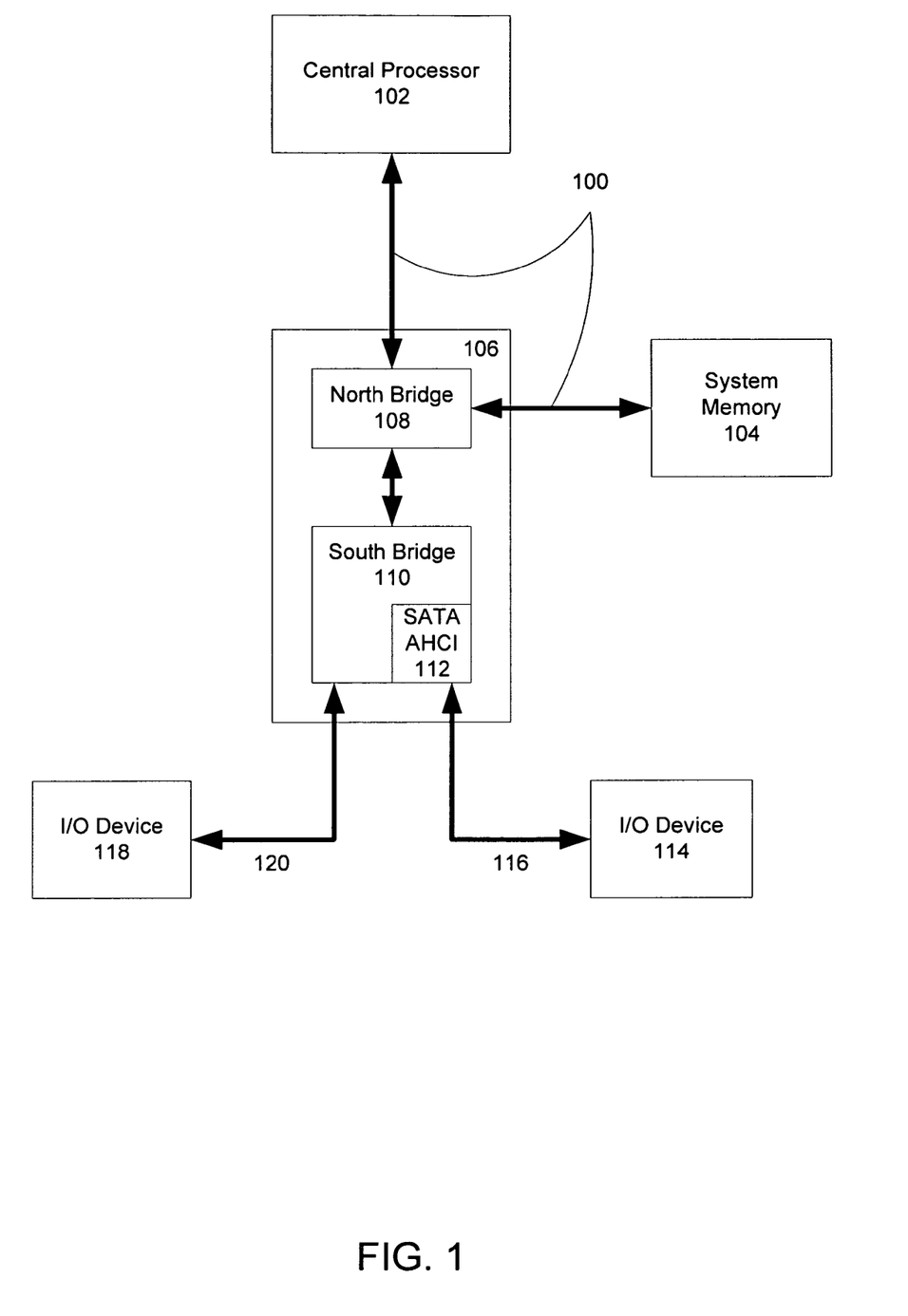
FIG. 1 is a block diagram of a computer system which may be used with embodiments of the present invention.

FIG. 1 is a block diagram of a computer system which may be used with embodiments of the present invention. The computer system comprises a processor-memory interconnect 100 for communication between different agents coupled to interconnect 100, such as processors, bridges, memory devices, etc. Processor-memory interconnect 100 includes specific interconnect lines that send arbitration, address, data, and control information (not shown). In one embodiment, central processor 102 is coupled to processor-memory interconnect 100. In another embodiment, there are multiple central processors coupled to processor-memory interconnect (multiple processors are not shown in this figure).

Processor-memory interconnect 100 provides the central processor 102 and other devices access to the system memory 104. A system memory controller controls access to the system memory 104. In one embodiment, the system memory controller is located within the north bridge 108 of a chipset 106 that is coupled to processor-memory interconnect 100. In another embodiment, a system memory controller is located on the same chip as central processor 102 (not shown). Information, instructions, and other data may be stored in system memory 104 for use by central processor 102 as well as many other potential devices.

I/O devices, such as I/O devices 114 and 118, are coupled to the south bridge 110 of the chipset 106 through one or more I/O interconnects. In one embodiment, interconnect 120 is a PCI interconnect and I/O device 118 is a network interface card. In one embodiment, I/O device 114 is a SATA device such as a hard disk, a CD drive, or a DVD drive. In this embodiment, interconnect 116 is a SATA interconnect that includes a SATA cable. In this embodiment, a SATA host controller and SATA AHCI 112 are located within the chipset 106. In one embodiment, the SATA AHCI 112 is located within the south bridge 110 of the chipset 106. The SATA host controller and AHCI 112 allow the SATA I/O device 114 to communicate with the rest of the computer system.

In one embodiment, the computer system in FIG. 1 has power management capabilities that put devices into low power states when they are not needed. In this embodiment, SATA device and bus power management are a part of the computer system power management. Furthermore, in this embodiment, the SATA host controller has the capability to allow the hot-plug/hot-unplug of SATA devices from the SATA bus.

Figure 2:
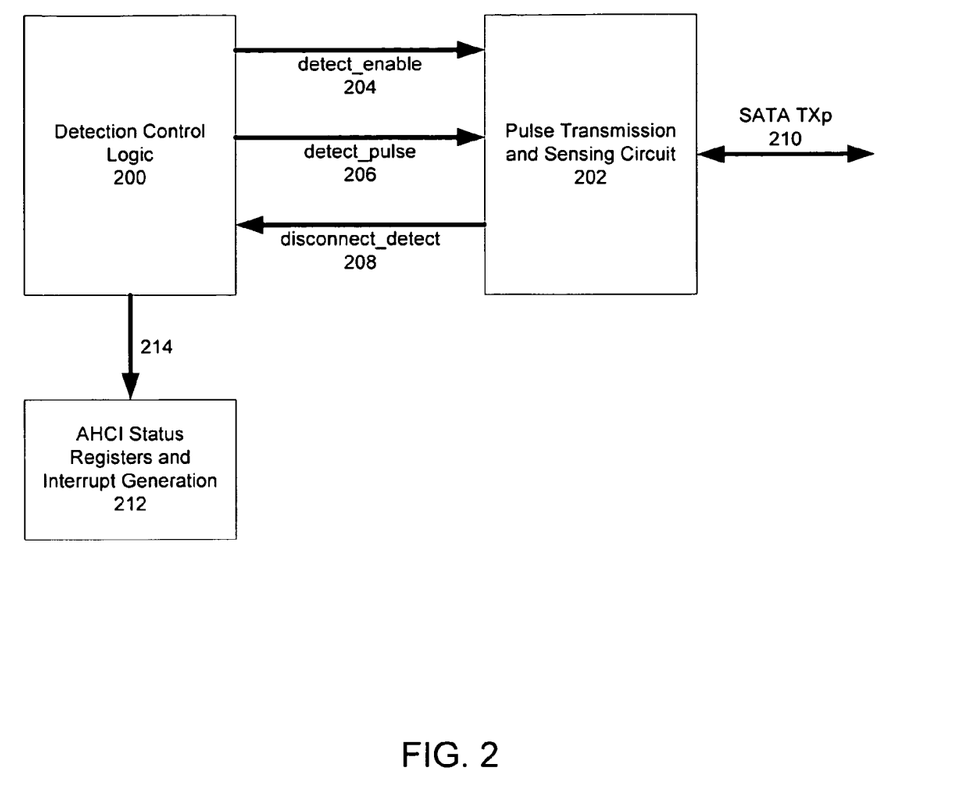
FIG. 2 shows one embodiment of the additional SATA logic and circuitry required for allowing hot-plugging/hot-unplugging of SATA devices while in a low power mode.

FIG. 2 shows one embodiment of the additional SATA logic and circuitry required for allowing hot-plugging/hot-unplugging of SATA devices while in a low power mode. In one embodiment, detection control logic 200 (also referred to as SATA core logic) is coupled to a pulse transmission and sensing circuit 202 by the detect_enable 204, detect_pulse 206, and disconnect_detect 208 signal lines. The pulse-transmission and sensing circuit 202 is additionally coupled to the SATATXp (SATA transmission line) 210. The detection control logic 200, with the help of the pulse-transmission and sensing circuit 202, can detect whether a SATA device is coupled to (i.e. plugged into) the SATATXp 210 by measuring the amount of time it takes the SATATXp to charge up from common mode voltage (Vcm) to positive supply voltage (Vcc) and then return to Vcm. In a different embodiment, the supply voltage could be negative.

In the current embodiment where the supply voltage is positive, the rate of charging up to Vcc depends on the presence of three key capacitances present in the system:

1. The capacitance of discrete capacitors connected on the host controller's transmission (TX) lines. The maximum capacitance is 12 nF per the SATA specification (Serial ATA AHCI 1.0 Specification). The minimum capacitance is unspecified in the specification but 2.5 nF is the lowest known in existing systems.
2. The capacitance of the SATA cable. This capacitance is ~1 pF/inch up to 2 meters in the case of external SATA.
3. The capacitance of discrete capacitors on the device reception (RX) lines if a device is present. This capacitance is typically 2.5 nF.

The effect of item #2 is negligible due to the cable capacitance having a 2 or 3 order of magnitude smaller capacitance than the capacitances in items #1 and #3.

Returning to FIG. 2, the pulse transmission and sensing circuit 202 can be activated by the detection control logic 200 once the SATA interface is put into the SATA Listen Mode or a SATA low power state whereby the normal SATA physical transmission on the SATATXn/p lines has completely ceased.

The detection control logic 200 enables the pulse transmission and sensing circuit 202 by asserting the detect_enable signal 204. At this point, the detection control logic 200 begins to transmit an active-low pulse, detect_pulse 206, for a duration ≧3 μs. In one embodiment, the duration is 5 μs for additional guard band. As described above, the active-low pulse causes the pulse-transmission and sensing circuit 202 to charge up on the SATATXp line from Vcm to Vcc and then return to Vcm after the 5 μs duration. Once the SATATXp line has charged up sufficiently, the pulse transmission and sensing circuit 202 sends a device_detection signal 208 to indicate the line has charged from Vcm to Vcc. The more capacitance there is on the SATATXp line, the longer it takes the line to charge to Vcc. Thus, because the SATATXp line has more capacitance when a device is plugged in, it takes the line considerably longer to charge to Vcc with a device present.

Therefore, the detection control logic 200 can determine whether a device is present on the SATATXp line depending on the amount of time it takes between sending the detect_pulse 206 to receiving the device_detection signal 208. In this embodiment, based on the known capacitances shown above, it can be determined that there is not a device present if the device_detection signal 208 returns to the detection control logic 200 the within 3 μs of the detection control logic 200 sending the detect_pulse 206. Otherwise, if the time between those two events takes longer than 7 μs, the detection control logic 200 can determine that a device is present. In one embodiment, sampling 1 μs after the assertion of the detect_pulse 206 determines if a device is present or not. In another embodiment, sampling after 3 μs also determines if a device is present or not and adds additional guard band and may eliminate low probability corner case sampling errors.

Figure 3:
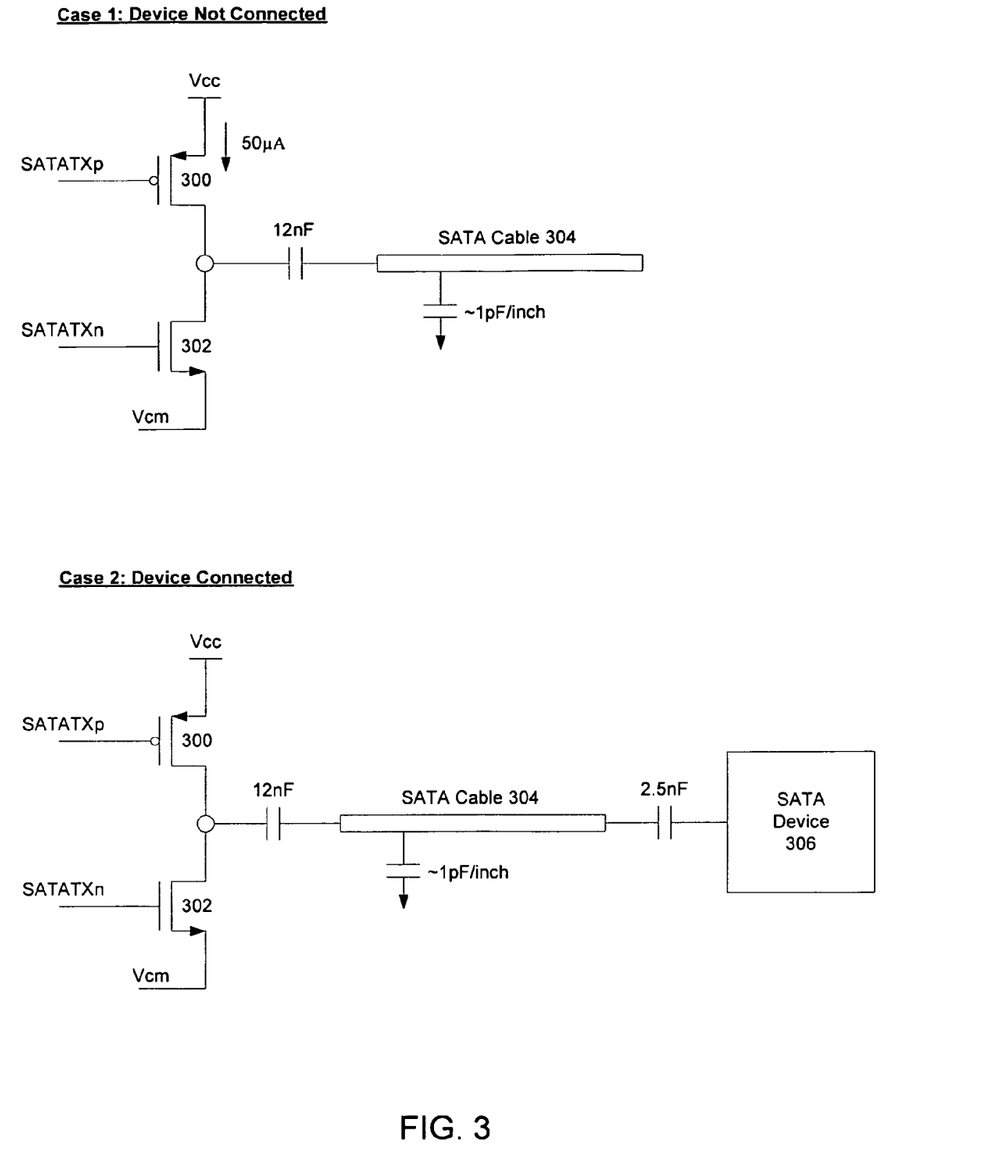
FIG. 3 illustrates one embodiment of the conceptual operation of the pulse transmission and sensing circuit.

Finally, in one embodiment, the detection control logic 200 also is coupled through one or more data lines to the AHCI status registers and interrupt generation 212 within the SATA host controller to report the status of device to the host controller if the status has changed from connected to unconnected FIG. 3 illustrates one embodiment of the conceptual operation of the pulse transmission and sensing circuit. The circuit injects a step pulse and monitors the rate of rising on the output. When a device is not connected to the SATA interconnect, the active low pulse enters on the SATATXp and SATATXn lines, the gate of the NMOS transistor 302 closes and the gate of the PMOS transistor 300 opens to allow the SATA transmission line including the SATA cable 304 to charge to Vcc. There are two inherent capacitances involved here that lengthen the charge time. First, the capacitance of the discrete capacitors on the host controller transmission line, shown here as the 12 nF capacitor, which is the specification maximum. Second, the capacitance of the SATA cable 304 itself, which amounts to around ~1 pF per inch of cable. This capacitance is not important because of how small it is compared to the capacitance of the discrete capacitors attached to the host transmission lines. When the step pulse ends and the SATATXp and SATATXn lines return to their previous state, the PMOS transistor 300 gate closes and the NMOS transistor 302 gate opens, allowing the built up charge to drain back to Vcm.

When a device is present (SATA device 306) and the same active low step pulse occurs, the time it takes the SATA transmission line to charge from Vcm to Vcc takes longer because there is additional capacitance attached to the line. The 2.5 nF discrete capacitor on the SATA device 306 receiving lines increases the capacitance of the entire circuit, and thus increases the time it takes the SATA transmission line to charge up to Vcc.

Figure 4:
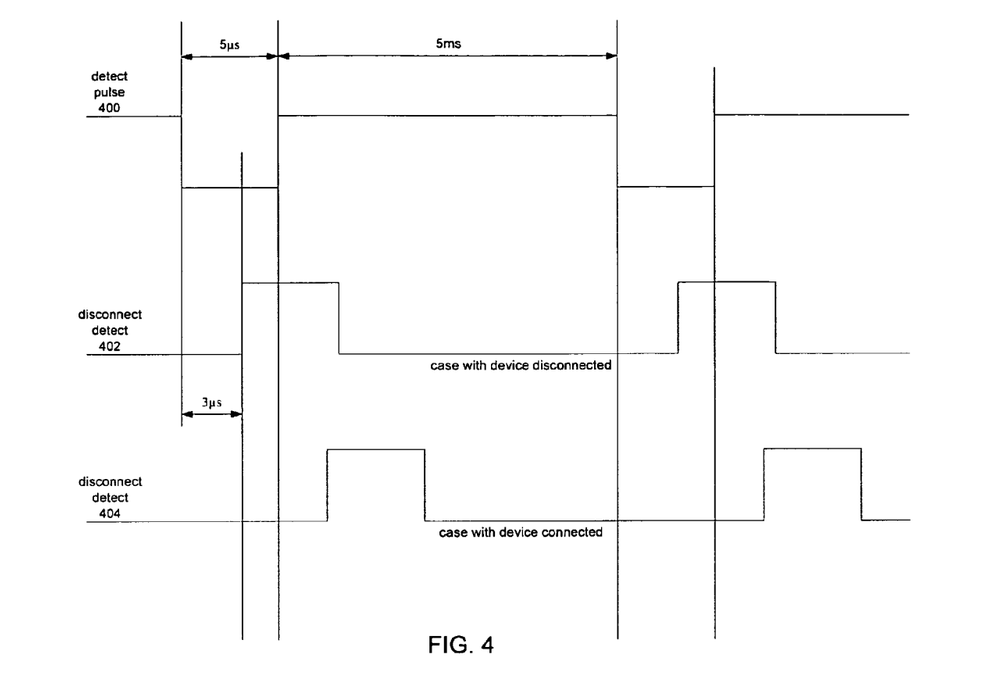
FIG. 4 describes one embodiment of the waveform for the signals in operation between the detection control logic and the pulse transmission and sensing circuit.

FIG. 4 describes one embodiment of the waveform for the signals in operation between the detection control logic and the pulse transmission and sensing circuit. In one embodiment, when the detect_pulse signal 400 is asserted, an active low step pulse is sent to from the detection control logic to the pulse transmission logic and sensing circuit for a period of 5 μs.

The middle waveform in FIG. 4 shows the timing of the disconnect_detect 402 signal when the pulse transmission and sensing circuit sends it back when a device is disconnected. In this scenario, the detection control logic can see the rising edge of the disconnect_detect signal 402 around 3 μs after the detect_pulse signal 400 was originally asserted. At this point, the detection control logic can determine that there is no device connected to the SATA transmission lines because the short delay requires a capacitance in the transmission lines that would be too low if a device were connected.

The bottom waveform in FIG. 4 shows the timing of the disconnect_detect 402 signal when the pulse transmission and sensing circuit sends it back when a device is connected. In this scenario, the detection control logic can see the rising edge of the disconnect_detect signal 402 after the detect_pulse signal 400 has been deasserted at 5 μs. At this point, the detection control logic knows that there is the extra capacitance of a device's discrete capacitors connected to the SATA transmission lines because the long delay requires a capacitance in the transmission lines that would be too high if no device was connected.

Figure 5:
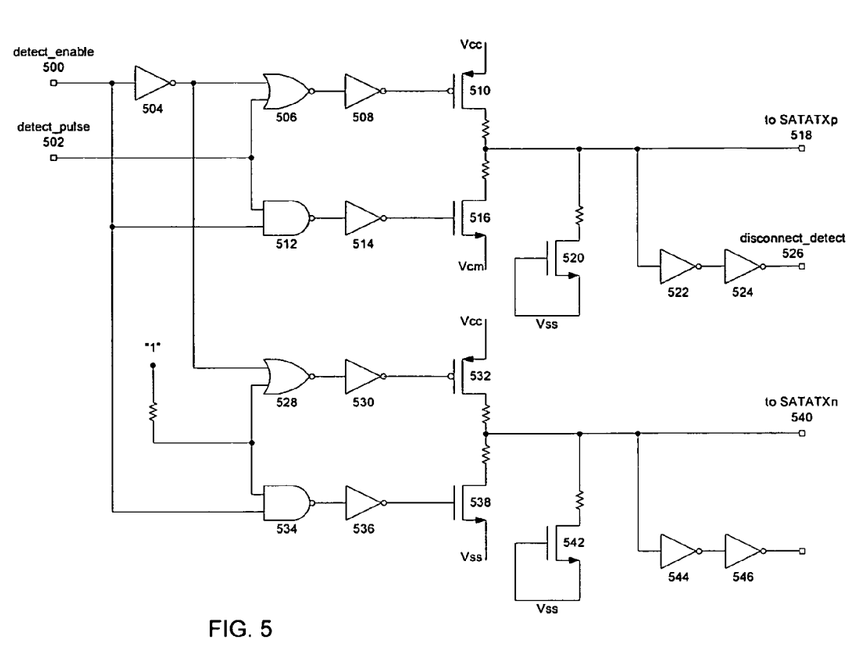
FIG. 5 illustrates one embodiment of the detailed circuitry within the pulse transmission and sensing circuit.

FIG. 5 illustrates one embodiment of the detailed circuitry within the pulse transmission and sensing circuit. The detect_enable 500 and detect_pulse 502 are inputs to the circuit from the detection control logic and the disconnect_detect 526 is the output to the detection control logic. Once the detection control logic has asserted the detect_enable signal 500 the pulse and transmission sensing circuit becomes operational. The upper half of the circuit deals with the SATATXp transmission line detection. First, the detect_enable signal 500 is sent directly to NAND gate 512 and, after passing through an inverter, to NOR gate 506. The detect_pulse signal 502 is the other input received by NAND gate 512 and NOR gate 506. The NOR gate passes the signal through inverter 514 to the gate of NMOS transistor 516. The NAND gate passes the signal through inverter 508 to the gate of PMOS transistor 510. These two transistors are both coupled to the SATATXp line 518 and allow the line to charge to Vcc or a drain to Vcm depending upon which transistor gate is open and which is closed (at any given time one transistor gate is open and one is closed). When NMOS transistor 516 has an open gate, the SATATXp line 518 is draining to Vcm. When the PMOS transistor 510 has an open gate, Vcc is charging the SATATXp line 518. In one embodiment, the disconnect_detect 526 output signal is sent to the detection control logic as soon as the SATATXp line 518 charges up sufficiently to flip the output of inverter 522, which will flip the output of inverter 524, which asserts the disconnect_detect signal 526.

The SATATXn transmission line 540 has a similar circuit that is implemented in one embodiment. In one embodiment, the SATATXn line 540 portion of the circuit is always operational because a logical "1" (or a positive supply voltage Vcc) is coupled to NOR gate 528 and NAND gate 534. Thus, the detect_enable signal is not utilized for the SATATXn 540 portion of the circuit. Additionally, in one embodiment, only one disconnect detect line is necessary to detect the presence of a device on the transmission lines. Therefore, since the disconnect_detect signal 526 from the SATATXp line 518 is utilized to provide the charge time for the detection control logic, the similar double inverter (544 and 546) disconnect_detect signal for SATATXn 540 is not utilizted. Though, the parasitic capacitance within the circuit requires the additional gates to be present to balance the entire circuit.

This detection mechanism is independent of device's low power state (Partial/Slumber SATA low power states). Depending on the physical layer implementation of the device on its receiving line termination, this detection mechanism can also detect un-powered device which has termination when device is not powered.

Returning to FIG. 2, in one embodiment, the detection control logic 200 includes a periodic timer to set a periodic delay between step pulses. In one embodiment, this periodic timer is set to 5 ms. Additionally, in one embodiment, the detection control logic 200 also includes an internal device presence flag to show the status of the device as present or not present. Furthermore, in one embodiment, the detection control logic 200 has the capability to update any SATA host controller information pertaining to the device. Thus, in one embodiment, if the detection control logic 200 determines that the device has been removed while in a SATA device low power state or Listen Mode, then the detection control logic 200 shall update the following:

Stop and re-initialize (for future usage) the periodic timer

Clear its internal device presence flag

Update the change in port status in the port where the device was located. The change in port status requires a modification to the host controller's configuration registers. Specifically, a change must be made to the PxSSTS.DET (Port SATA Status Device Detection) register that specifically shows the port's status, where x=the number of the port where the device was located. The update must be made to change the value to "0h", which means that no device is detected and physical communication is not established.

Set the AHCI PxSERR.DIAG.X (Port SATA Error, Diagnostics, Exchanged) value to "1h". When set to one this bit indicates a communication initialization signal was received. This bit causes the PxIS.PCS (Port Interrupt Status, Port Connect Change Status) to also to be set to "1h", which generates an interrupt if interrupts are enabled.

In one embodiment, in order to prevent a continuous interrupt loop due to unpowered device detection in Listen Mode, the detection control logic 200 includes a Device Detection During Listen Mode internal hardware flag. In one embodiment, this flag is set when a device is detected during Listen Mode. The device may be powered or unpowered. In one embodiment, setting this flag triggers setting of PxSERR.DIAG.X bit as described above. The detection control logic 200 will automatically clear this bit if it does not detect a device through the pulse transmission and sensing circuit 202 device detection process as described above. Additionally, the flag is reset when the port is reset by the SATA host controller.

In one embodiment, when the flag is set the following process is subsequently completed by the detection control logic:

Subsequent device detection by the detection control logic 200 and the pulse transmission and sensing circuit 202 does not set the PxSERR.DIAG.X bit when in Listen Mode A squelch circuit is enabled to eliminate noisy feedback from causing false positives in the detection circuit.

The PxSSTS.DET value remains as "0h".

The periodic timer used in determining the duration in between step-pulse transmissions should have a granularity smaller than the fastest rate a user can unplug a device and re-insert a device.

In one embodiment, there are boundary conditions that require special routines be put in place in order to accurately determine if a device has been removed or not. These boundary conditions include:

1. A device's unsuccessful exit from the Partial or Slumber low power modes after the SATA host controller initiates a COMWAKE command to the device.
2. A device's unsuccessful exit from the Partial or Slumber low power modes after the SATA device initiates a COMWAKE command.

In both cases #1 and #2, the SATA device somehow fails to complete the wake sequence and the interface remains in a non-connected state. In one embodiment, the detection mechanism includes hardware to determine that a device has been disconnected or not. This hardware can either reactivate the circuit to do another device presence detection or it can activate further external hardware.

If detection control logic 200 determines that the device has since been removed while in low power state, the logic updates the AHCI PxSERR.DIAG.X and PxIS.PCS bits to indicate the change in port status. The detection control logic 200 also clears its internal device presence flag. If interrupts are enabled by the host controller, the AHCI device driver can respond to the event as well as to any subsequent device insertion which may or may not be the same device.

Figure 6:
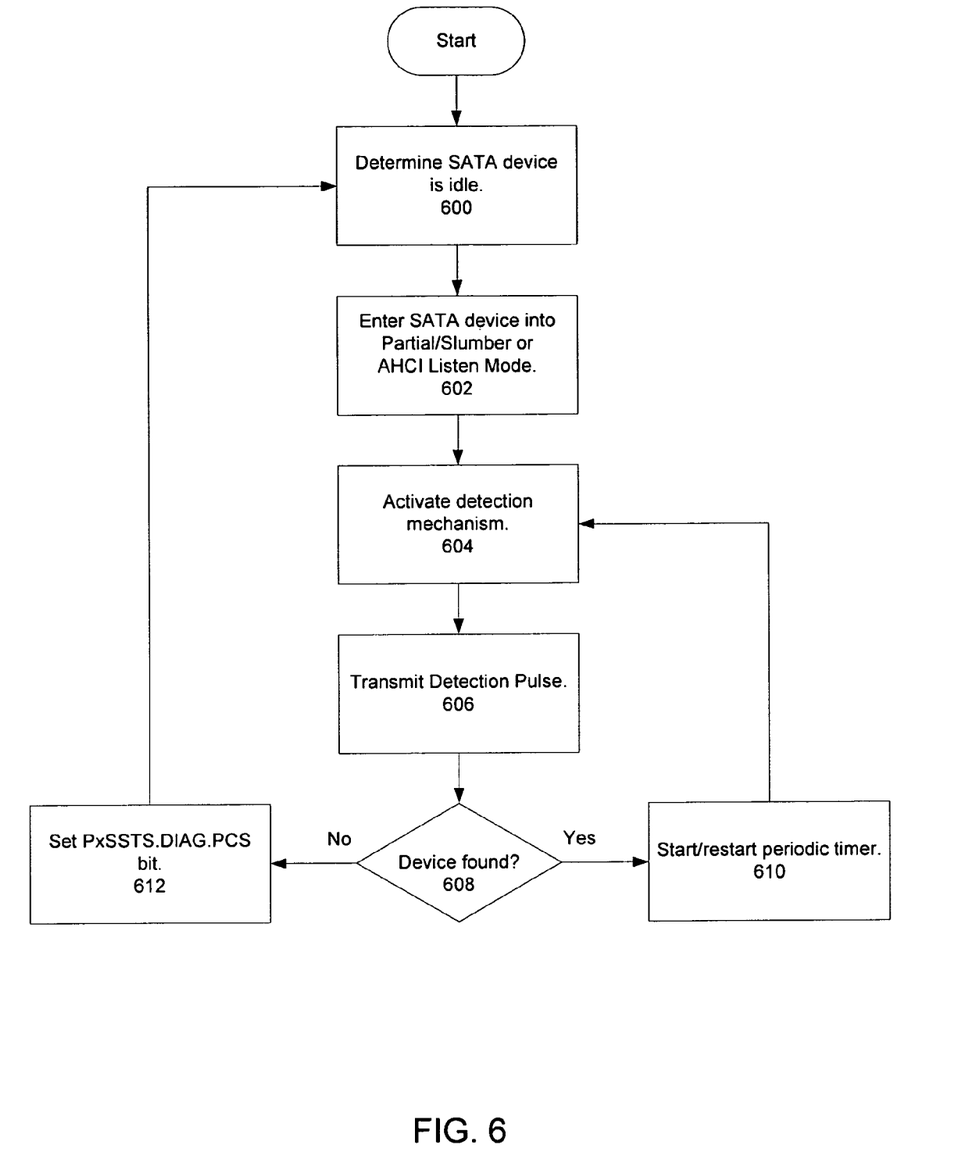
FIG. 6 is a flow diagram of one embodiment of a process to detect a SATA device disconnect in a power savings mode.

FIG. 6 is a flow diagram of one embodiment of a process to detect a SATA device disconnect in a power savings mode. The process is performed by processing logic that may comprise hardware (circuitry, dedicated logic, etc.), software (such as is run on a general purpose computer system or a dedicated machine), or a combination of both. Referring to FIG. 6, the process begins by processing logic determining if the SATA device is idle (processing block 600). Once the determination is made that the device is idle, processing logic enters the SATA device into a Partial or Slumber low power mode or an AHCI Listen Mode (processing block 602).

Then, processing logic activates the detection mechanism (processing block 604). Once the detection mechanism is activated, processing logic transmits a detection pulse, which is a step pulse sent to the detection mechanism (processing block 606). After the detection pulse has been sent, processing logic determines whether a device has been found (processing block 608). In one embodiment, processing logic receives a detect disconnect signal from the detection mechanism after a certain amount of time has elapsed after transmitting the detection pulse. In this embodiment, the length of time between the transmission of the detection pulse and the reception of the disconnect detect signal determines whether a device is present or not on the transmission line.

If a device has been found, the processing logic starts or restarts an internal periodic timer, which counts down a delay between each detection pulse transmission (processing block 610). Then, after the timer has counted down, the process returns to block 604 where the detection mechanism is once again activated and the process repeats. Otherwise, if a device has not been found, then processing logic sets the SATA Host Controller's PxSSTS.DIAG.PCS bit to "0h" (where x=the port that the transmission line is connected to) to indicate that there is no device present on the transmission line (processing block 612). Once the bit has been set, then the process starts over by returning to block 600.

Thus, embodiments of a method, apparatus, and system to enable native SATA device presence detection and hot-plugging in SATA AHCI low power mode are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
    sending a step pulse across a high-speed serial transmission line;
    determining a length of time the transmission line takes to charge from common mode voltage to supply voltage; and
    determining whether a device is connected to the transmission line based on the length of the transmission line charge time.

2. The method of claim 1, further comprising toggling a disconnect detect signal if a device is not connected to the transmission line.

3. The method of claim 2, further comprising determining that a device is not connected to the transmission line if the disconnect detect signal is detected within 3 microseconds of a leading edge of the step pulse.

4. The method of claim 1, wherein the length of the transmission line charge time is based on a capacitance of the transmission line.

5. The method of claim 4, wherein the transmission line capacitance comprises a sum of the capacitance of one or more discrete capacitors coupled to one or more transmission lines in a host, one or more discrete capacitors coupled to one or more reception lines in the device, and any transmission line cable capacitance.

6. The method of claim 1, wherein sending a step pulse across a transmission line occurs once after each of a plurality of predetermined equal time intervals.

7. The method of claim 6, wherein the time interval between step pulses is 5 milliseconds.

8. The method of claim 1, wherein the transmission line comprises a serial advanced technology attachment (SATA) transmission line.

9. An apparatus, comprising:
    a detection circuit to send a step pulse across a high-speed serial transmission line and to determine a length of time the transmission line takes to charge from common mode voltage to supply voltage; and
    core logic to determine whether a device is connected to the transmission line based on the length of the transmission line charge time.

10. The apparatus in claim 9, wherein the transmission line comprises a serial advanced technology attachment (SATA) transmission line.

11. The apparatus of claim 10, wherein the detection circuit and the core logic operate to detect whether the device is connected to the transmission line when a SATA Advanced Host Controller Interface (AHCI) is in a partial or slumber low power state or when the SATA AHCI is operating in Listen Mode without access to an interlock switch, cold presence detect, or GPIO-based detection hardware.

12. The apparatus of claim 10, wherein the SATA core logic is further operable to:
    enable the detection circuit by sending a detect enable signal to the detection circuit; and
    send the step pulse signal to the detection circuit.

13. The apparatus of claim 12, wherein the SATA core logic is further operable send a plurality of step pulse signals to the detection circuit once every 5 milliseconds in accordance with an internal periodic timer.

14. The apparatus of claim 13, wherein the detection circuit is further operable to send a detect disconnect signal to the SATA core logic for device presence detection once the transmission line has charged from common mode voltage to supply voltage.

15. The apparatus of claim 14, wherein the SATA core logic is further operable to store the status of the presence of the device in an internal device presence flag.

16. The apparatus of claim 15, wherein the SATA core logic is further operable to
    determine whether the device has been disconnected from the transmission line, wherein the device was previously present but the current step pulse reflection shows the device is absent; and
    if the device has been disconnected,
        stop and reinitialize the periodic timer;
        clear the internal device presence flag;
        update a change in port stats in the SATA AHCI to show no device is currently detected on a port connected to the transmission line; and
        set an AHCI PxSERR.DIAG.X bit for the port to '1' to notify the SATA AHCI there was a change in a current connection status of the device on the transmission line.

17. The apparatus of claim 15, wherein the SATA core logic is further operable to
    determine whether a device is connected to the transmission line and the SATA AHCI is operating in Listen Mode,
    if a device is detected,
        set an internal Device Detection During Listen Mode flag; and
        set the AHCI PxSERR.DIAG.X bit for the port connected to the transmission line to '1' to notify the SATA AHCI there was a change in a current connection status of the device on the transmission line.

18. The apparatus of claim 15, wherein the SATA core logic is further operable to
    determine whether a device has not exited from either the partial or slumber low power state after a SATA host or SATA device initiated COMWAKE command; and if the device has not exited send a detect pulse signal to the detection circuit to initiate a step pulse for device detection determination.

19. A system, comprising:
a first interconnect;
a processor coupled to the first interconnect;
a memory coupled to the first interconnect;
a network interface card coupled to the first interconnect;
a second interconnect comprising a high-speed serial interconnect, wherein the interconnect includes one or more transmission lines;
a chipset coupled to the first interconnect and the second interconnect;
a detection circuit coupled to the second interconnect to send a step pulse across a one or more transmission lines and to determine the length of time the transmission line takes to charge from common mode voltage to supply voltage; and
core logic to determine whether a device is connected to the transmission line based on the length of the transmission line charge time.

20. The system of claim 19, wherein the interconnect is a serial advanced technology attachment (SATA) interconnect.

21. The system of claim 20, wherein the detection circuit and the SATA core logic operate to detect whether the device is connected to the transmission line when a SATA Advanced Host Controller Interface (AHCI) is in a partial or slumber low power state or when the SATA AHCI is operating in Listen Mode without access to an interlock switch, cold presence detect, or GPIO-based detection hardware.

22. The system of claim 20, wherein the SATA core logic is further operable to:
enable the detection circuit by sending a detect enable signal to the detection circuit; and
send the step pulse signal to the detection circuit.

23. The system of claim 22, wherein the detection circuit is further operable to send a detect disconnect signal to the SATA core logic for device presence detection once the transmission line has charged from common mode voltage to supply voltage.

24. The system of claim 23, wherein there are a plurality of processors coupled to the first interconnect.

* * * * *